Patented Oct. 26, 1954

2,692,873

UNITED STATES PATENT OFFICE 2,692,873

ELASTOMERS FROM POLYALKYLENE ETHER GLYCOL REACTED WITH ARYLENE DIISOCYANATE AND WATER

Esley O. Langerak, Newport, and Lawrence J. Prucino and William R. Remington, Wilmington, Del., assignors to E. I. du Pont de Nemours & Company, Wilmington, Del., a corporation of Delaware No Drawing. Application May 17, 1952, Serial No. 288,531

13 Claims. (Cl. 260—77.5)

This invention relates to an improved process for the preparation of elastomeric condensation products from the reaction between polyalkylene ether glycols and arylene diisocyanates.

It is well known that diisocyanates may be reacted with dihydroxy compounds to form condensation products or copolymers. Many of these products are thermoplastic resins. In Hill U. S. application Serial No. 237,660, filed July 19, 1951, now abandoned, there is described the formation of tough rubbery products by the reaction between polyalkylene ether glycols and arylene diisocyanates in the presence of moisture. Useful elastomers are obtained by this process, for example, by the reaction of a polyethylene ether glycol having a molecular weight of from 4000 to 10,000 with tolylene-2,4-diisocyanate in the presence of small amounts of water.

According to the present invention, it has been found that an improved product is obtained when the reaction between the polyalkylene ether glycol, arylene diisocyanate and water is carried out in the presence of small amounts of an acid-reacting compound selected from the group consisting of acid halides in which the halogen has an atomic weight between 35 and 127 and inorganic acids.

In a preferred embodiment of this invention, the polyalkylene ether glycol and the arylene diisocyanate are heated together in the presence of the acid-reacting compound but without any added water, in order to form a "pre-polymer," and water is thereafter incorporated in the mixture and the composition is cured to form the ultimate elastomer.

The method of carrying out the process of this invention is illustrated by the following examples, in which parts are by weight:

Example 1

Into a glass vessel are placed 58 parts of a polymeric ethylene ether glycol of average molecular weight 1540. This is melted by warming externally with steam to 80° C. There are then added 27.8 parts of tolylene-2,4-diisocyanate and 0.12 part of benzoyl chloride (molar ratio of isocyanate to glycol 4:1). The mixture is heated for 2 hours at 80° C. The viscous amber-colored solution is transferred to a Werner-Pfleiderer mill which has been preheated to 75° C. The mass is then milled and 0.47 part of pyridine is added, followed immediately by 2.0 parts of water. The mass is milled for 1 hour at 75° C. Then 2.0 additional parts of water are added. In 20 minutes the product shreds off the mill blades in rubbery chunks and is then removed from the mill.

The rubbery chunks are cured by putting a quantity in a press having a rectangular die and heating for 1 hour at 140° C. under a pressure of 2,800 lbs. per sq. in. A transparent slab results which has the following properties:

Tensile strength_____lbs./sq. in__ 2225
Percent elongation at the break_per cent__ 280
Brittle point_____° C__ —42.8
Modulus at 200% elongation_lbs./sq. in__ 1550

In a control experiment carried out in the same way except that no benzoyl chloride is added, the primary condensation product is a solid, porous, spongy mass. On milling in the W-P mill the product yields a mass of soft crumbs. On curing for 1 hour at 140° C. under 8,000 lbs. per sq. in. pressure a coherent mass is not obtained. On continuing the cure for 18 hours, a clear, yellow, non-homogeneous slab is obtained which is so weak that it can be torn by hand.

Example 2

Using the same equipment as in Example 1, 60 parts of a polyethylene ether glycol of average molecular weight 1000 are warmed to 100° C. and 31.3 parts of tolylene-2,4-diisocyanate containing 0.06 part of phosphorus pentachloride are added (mol ratio of isocyanate to glycol 3:1). The mixture is stirred and held for 1 hour at 100° C. Then 0.47 part of pyridine is added and after thorough mixing the viscous solution is transferred to the W-P mill which has been preheated to 75° C. The mill is started, 4.0 parts of water are added and milling is continued for 40 minutes, when the product shreds off in tough rubbery chunks.

On curing for 1 hour at 140° C. at 2,800 lbs. per sq. in. pressure a clear, transparent, homogeneous, amber-colored slab is obtained. The elastomer possesses the following properties:

Tensile strength_____lbs./sq. in__ 1625
Elongation at break_____ per cent__ 540
Brittle point_____° C__ —40
Modulus at 200% elongation___lbs./sq. in__ 850

Example 3

The process of Example 2 is repeated using 0.138 part of benzene sulfonyl chloride in place of the phosphorus pentachloride. After curing, the product has the following properties:

Tensile strength_____lbs./sq. in__ 3275
Elongation at break_____per cent__ 540
Brittle point_____° C__ —40
Modulus at 200% elongation___lbs./sq. in__ 1000

Example 4

The process of Example 2 is repeated using 0.06 part of hydrogen chloride, added as 0.162 part of a 37% aqueous solution, in place of the phosphorus pentachloride. Six (6) parts of water are added instead of 4. The balance of the process is then the same. The cured product has the same appearance as that of Example 2 and has the following properties:

| | |
|---|---|
| Tensile strength_____lbs./sq. in__ | 1000 |
| Elongation at the break_____per cent__ | 480 |
| Brittle point_____° C__ | −45.6 |
| Modulus at 200% elongation__lbs./sq. in__ | 600 |

Example 5

The process of Example 2 is repeated using 0.12 part of p-methoxy benzoyl chloride in place of the phosphorus pentachloride. The properties of the resulting rubber are as follows:

| | |
|---|---|
| Tensile strength_____lbs./sq. in__ | 650 |
| Elongation at break_____per cent__ | 580 |
| Brittle point _____° C__ | −37 |
| Modulus at 200% elongation___lbs./sq. in__ | 475 |

Example 6

The process of Example 2 is repeated using 0.11 part of 100% sulfuric acid, added as 95.5% sulfuric acid, in place of the phosphorus pentachloride. The rubber obtained has the following properties:

| | |
|---|---|
| Tensile strength_____lbs./sq. in__ | 1270 |
| Elongation at break_____per cent__ | 480 |
| Brittle point _____° C__ | −45 |
| Modulus at 200% elongation___lbs./sq. in__ | 500 |

Example 7

The process of Example 2 is repeated using 0.164 part of thionyl chloride in place of the phosphorus pentachloride. Rubber having the following properties is obtained:

| | |
|---|---|
| Tensile strength_____lbs./sq. in__ | 3150 |
| Elongation at break_____per cent__ | 500 |

Example 8

The process of Example 2 is repeated using 0.25 part of p-toluene sulfonyl chloride in place of the phosphorus pentachloride. The rubber obtained has the following properties:

| | |
|---|---|
| Tensile strength_____lbs./sq. in__ | 850 |
| Elongation at break_____per cent__ | 400 |

Example 9

One hundred (100) parts of a polypropylene ether glycol of an average molecular weight of 1025 are stirred in a glass vessel at 100° C. for 1 hour with 52.2 parts of tolylene-2,4-diisocyanate and 0.19 part of phosphorus trichloride. The resulting thick liquid is transferred to a Werner-Pfleiderer mill previously heated to 75° C. The mill is started and there is added 0.637 part of pyridine and 4.0 parts of water. After milling at 75° C. for 30 minutes, an additional 2.6 parts of water are added. A further milling for 40 minutes produces a rubbery crumbly mass.

A portion is cured in a press for 20 minutes at 135° C. and 2,800 lbs. per sq. in. pressure. The resulting transparent slab has the following properties:

| | |
|---|---|
| Tensile strength_____lbs./sq. in__ | 4150 |
| Elongation at break_____per cent__ | 380 |
| Modulus at 300% elongation___lbs./sq. in__ | 2225 |
| Brittle point _____° C__ | −42 |

Example 10

Into a Werner-Pfleiderer mixer preheated to 100° C. are placed 99 parts of n-butylene ether glycol of an average molecular weight of 10,000. After the glycol is melted, 26.1 parts of tolylene-2,4-diisocyanate and 0.38 part of phosphorus trichloride are added. This amount of phosphorus trichloride is required because a 5% aqueous slurry of the glycol shows a pH of 9.3. After the addition, the reaction mass shows a pH of 4 on general purpose indicator paper. The mass is then milled 1 hour at 100° C. A clear yellow viscous liquid results. A total of 1.2 parts of pyridine and 3.0 parts of water is then added with continued milling in three equal increments at intervals of 20 minutes. The temperature is held at 100° C. during this time. At the end of 30 minutes after the last addition the product is in the form of white doughy chunks. The mass is then worked on a rubber mill at 30° C. to a smooth homogeneous white band.

A portion is cured in a mold at 140° C. under 2800 lbs. per sq. in. pressure for 1 hour. An opaque, cream-colored slab is obtained. It is tough and rubbery and has a tensile strength at the break of 4800 lbs. per sq. in.

Example 11

Thirty-three (33) parts of a polyalkylene ether glycol of the general formula $HO(C_2H_4OCH_2O)_nH$ with an average molecular weight of 1650 are thoroughly mixed with 13.9 parts of tolylene-2,4-diisocyanate and 0.05 part of benzene sulfonyl chloride and heated at 100–110° C. for 1 hour in a closed container. The mixture is then cooled to 90° C. and 0.3 part of pyridine and 1.4 parts of water are added and thoroughly mixed in. The resultant viscous mass is poured into a pan and baked in an oven at 80° C. for 30 minutes. The somewhat tacky solid mass is then milled on a cold rubber mill to form a smooth homogeneous band. A portion is cured by heating in a mold at 130° C. for 30 minutes under a pressure of 7000 lbs. per square inch. A soft, elastic and transparent slab is obtained.

The term "polyalkylene ether glycols" as used throughout the specification and claims refers to polyethers which are derived from alkylene oxides or glycols or from other heterocyclic ethers such as dioxolane, and which may be represented by the formula $HO(RO)_nH$ in which R stands for an alkylene radical such as methylene, ethylene, propylene, etc. and $n$ is an integer greater than 1. Not all of the alkylene radicals present need be the same. Glycols containing a mixture of radicals, as in the compound $HO(CH_2OC_2H_4O)_nH$, can be used. These glycols are either viscous liquids or waxy solids. The glycols which are useful in the process of this invention have molecular weights of at least 750 and may have molecular weights as high as 10,000. The preferred glycols are the polyethylene ether glycols, the polypropylene ether glycols and the polybutylene ether glycols.

Any of a wide variety of arylene diisocyanates may be employed in this process. Representative compounds include tolylene - 2,4 - diisocyanate, meta-phenylene diisocyanate, 1-chlorophenylene-2,4-diisocyanate, and naphthalene-1,5-diisocyanate. These compounds may contain other substitutents on the aryl rings and the isocyanate groups may be attached to the same or different rings.

The molar ratio of arylene diisocyanate to polyalkylene ether glycol is preferably between 2:1 and 12:1, although mixtures in other proportions may be used. When using a polyalkylene ether glycol of relatively low molecular weight, e. g., from 750 to about 3000, the molar ratio of diisocyanate to glycol is preferably between 2:1 and 7:1. With higher molecular weight glycols, a higher ratio of diisocyanate to glycol is desirable. Thus for a glycol of molecular weight 6000 the preferred ratio is from 8:1 to 12:1, while for a glycol of molecular weight 1000, the preferred molar ratio is about 3:1.

The acid-reacting compound which is added according to this invention is an acid chloride, an acid bromide, an acid iodide or an inorganic acid. When an acid halide is used, it may be derived from either an organic acid or an inorganic acid. Representative and useful members of this class of compounds are hydrogen chloride, hydrogen bromide, hydrogen iodide, sulfuric acid, nitric acid, phosphoric acid, acetyl chloride, acetyl bromide, benzenesulfonyl chloride, sulfurous oxybromide, sulfurous oxychloride, phosphorus tribromide, phosphorus trichloride, phosphorus pentachloride, phosphorus oxychloride, phosphorus oxybromide, and benzoyl chloride. Simple organic halides such as benzyl chloride are not operable. Acid fluorides are in general too volatile to be useful in this process. Free carboxylic acids such as acetic, benzoic, etc. cannot be used as they react with the isocyanate with liberation of carbon dioxide.

Some benefit is obtained from the use of less than about 0.1% of the acid-reacting substance, based on the weight of the isocyanate, but the results are less satisfactory than if higher amounts are employed. When more than 0.5% of the acid-reacting substance is used, the physical properties such as tensile strength and abrasion resistance of the resulting elastomers tend to be somewhat impaired. If any component of the reaction mixture contains appreciable amounts of alkaline materials, it is of course necessary to employ increased amounts of acid-reacting substances to neutralize this alkalinity. As the glycol is more apt to be alkaline than the diisocyanate, it is well to add the acid-reacting substance in such amount that a 5% dispersion or solution in water of a mixture of it with the glycol shows a pH of 6.0 or less.

The acid-reacting substance may be added at the time of mixing the glycol and diisocyanate, may be incorporated with either or both of the reactants prior to mixing, or may be added after mixing has taken place but prior to the addition of water. The resulting composition must be on the acid side, though the actual acidity cannot be measured accurately by the pH of a water solution, since the diisocyanate reacts with the water to yield $CO_2$. An approximation of the true pH may be obtained by the use of general purpose indicator papers.

It is necessary that at least the latter stages of the reaction be conducted in the presence of water, preferably in amounts from 0.5 to 1.5 moles per mole of arylene diisocyanate. This amount of water is added to the mixture unless the components of the reaction mixture already contain a sufficient amount of water. If greater amounts of water are present, the excess acts as a plasticizer for the rubbery product. With smaller amounts, the reaction proceeds more slowly and does not always go to completion or results in a product not having the desired physical properties.

Although the mechanism of the reaction is not fully understood, it is believed that it involves first a copolymerization of the glycol and the diisocyanate to form linear chains containing urethane linkages. Excess diisocyanate may then react with water to give substituted ureas which are capable of further reaction with the original linear polymers. In this way the linear polymers, which may be referred to as the "prepolymers," are cross-linked and extended to form the ultimate elastomeric product. The function of the acid-reacting substance in this process appears to be to prevent premature cross-linking of the linear polymers and resinification of the reaction mixture.

It is desirable to conduct the reaction in two steps. During the first step the "pre-polymer" is formed in the substantial absence of water, and during the second step water is added and cross-linking takes place to form the final product. In this way, greater capacity can be obtained with the same mixing equipment since during the pre-polymerization step, the mixture is liquid and easily agitated whereas in the final condensation step, more strenuous agitation is required. The Werner-Pfleiderer mill is typical of suitable mixing equipment of the latter sort. The mixing equipment may be of any desired construction but should be resistant to acid and to the other reactants.

As the reaction is carried out in the liquid phase, the temperature should be above the melting point of the glycol. Generally, temperatures of 50° to 100° C. are satisfactory. From one to two hours reaction time is ordinarily adequate to complete the pre-polymerization step, and a somewhat shorter time for the condensation step. The only detrimental effect of using longer reaction times which has been observed is a gradual darkening of the coloring of the product.

Elastomers prepared according to the process of this invention have better tensile strength and modulus of elasticity and are more risistant to abrasion than are the similar products prepared according to the prior art. The present process employing an acid-reacting substance during the condensation is of particular value with the lower molecular weight glycols, especially with polyethylene ether glycol of relatively low molecular weight. With such glycols, unless the acid-reacting substance is used, there is a tendency to form gels which are not easily converted to elastomeric products. With the acid-reacting substance present, however, elastomers of excellent strength and elasticity may be obtained. By the use of the present process the reaction proceeds smoothly and more reproducibly than in the absence of the acid-reacting substance.

What is claimed is:

1. In a process for preparing an elastomeric condensation product by heating together a polyalkylene ether glycol having a molecular weight between 750 and 10,000 with an arylene diisocyanate in the presence of water, the improvement which comprises carrying out the heating in the presence of from 0.1 to 0.5%, based on the weight of diisocyanate, of an acid-reacting compound selected from the group consisting of acid halides in which the halogen has an atomic weight between 35 and 127 and inorganic acids.

2. A process according to claim 1 in which the polyalkylene ether glycol is a polyethylene ether glycol.

3. A process according to claim 1 in which the polyalkylene ether glycol is a polypropylene ether glycol.

4. A process according to claim 1 in which the polyalkylene ether glycol is a polybutylene ether glycol.

5. A process according to claim 1 in which the arylene diisocyanate is tolylene-2,4-diisocyanate.

6. A process according to claim 1 in which the arylene diisocyanate is meta-phenylene diisocyanate.

7. In a process for preparing an elastomeric condensation product by heating together a polybutylene ether glycol having a molecular weight between 750 and 10,000 with tolylene-2,4-diisocyanate in the presence of water, the improvement which comprises carrying out the heating in the presence of from 0.1 to 0.5%, based on the weight of diisocyanate, of an acid-reacting compound selected from the group consisting of acid halides in which the halogen has an atomic weight between 35 and 127 and inorganic acids.

8. A process for preparing an elastomeric condensation product which comprises heating together at a temperature between 50 and 100° C. a polyalkylene ether glycol having a molecular weight between 750 and 10,000 and an arylene diisocyanate in the presence of from 0.1 to 0.5%, based on the weight of diisocyanate, of an acid-reacting compound selected from the group consisting of acid halides in which the halogen has an atomic weight between 35 and 127 and inorganic acids, the molar ratio of diisocyanate to glycol being between 2:1 and 12:1, incorporating in the mixture 0.5 to 1.5 moles of water per mole of diisocyanate and thereafter curing the composition.

9. A process according to claim 8 in which the polyalkylene ether glycol is a polyethylene ether glycol.

10. A process according to claim 8 in which the polyalkylene ether glycol is a polybutylene ether glycol.

11. A process according to claim 8 in which the arylene diisocyanate is tolylene-2,4-diisocyanate.

12. A process for preparing an elastomeric condensation product which comprises heating together at a temperature between 50° and 100° C. a polybutylene ether glycol having a molecular weight between 750 and 10,000 and a tolylene-2,4-diisocyanate in the presence of from 0.1 to 0.5%, based on the weight of diisocyanate, of an acid-reacting compound selected from the group consisting of acid halides in which the halogen has an atomic weight between 35 and 127 and inorganic acids, the molar ratio of diisocyanate to glycol being between 2:1 and 12:1, incorporating in the mixture 0.5 to 1.5 moles of water per mole of diisocyanate and thereafter curing the composition.

13. In a process for preparing an elastomeric condensation product by the reaction of a polyalkylene ether glycol having a molecular weight between 750 and 10,000 with an arylene diisocyanate in the presence of water, the improvement which comprises adding prior to any substantial reaction between the water and the other components from 0.1 to 0.5%, based on the weight of diisocyanate, of an acid-reacting compound selected from the group consisting of acid halides in which the halogen has an atomic weight between 35 and 127 and inorganic acids.

References Cited in the file of this patent

UNITED STATES PATENTS

| Number | Name | Date |
|---|---|---|
| 2,531,392 | Breslow | Nov. 28, 1950 |